Jan. 5, 1971
J. C. LESHER
3,553,561
AUTOMATIC VARYING RATE BATTERY CHARGER UTILIZING TRANSISTOR
LATCHING MEANS IN VOLTAGE SENSING CIRCUIT
Filed Nov. 13, 1967
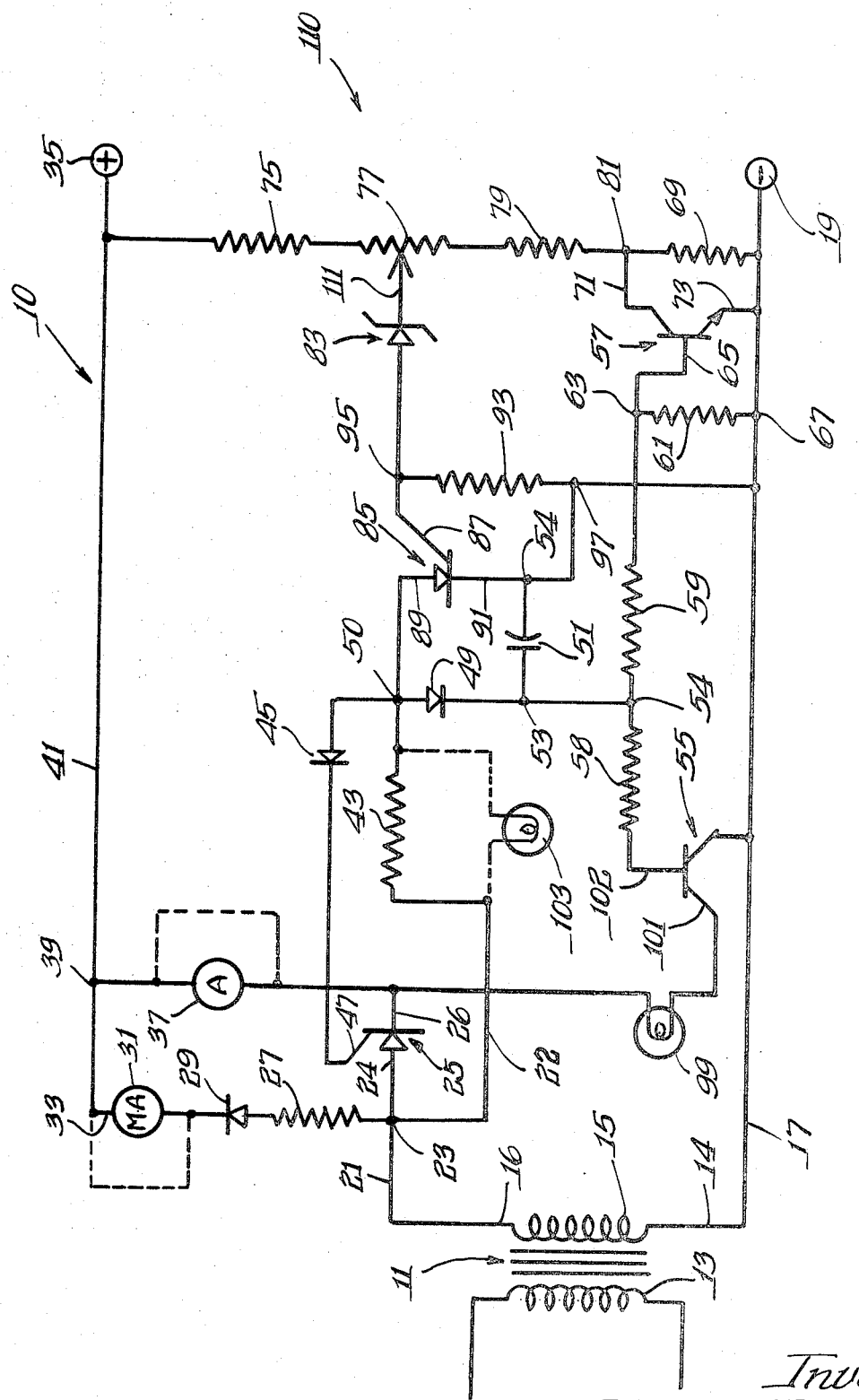
Inventor
John C. Lesher
By: Olson, Trexler, Wolters & Bushnell attys

United States Patent Office 3,553,561
Patented Jan. 5, 1971

3,553,561
AUTOMATIC VARYING RATE BATTERY CHARGER UTILIZING TRANSISTOR LATCHING MEANS IN VOLTAGE SENSING CIRCUIT
John C. Lesher, Erie, Pa., assignor to Penn-Western Electric, Erie, Pa., a corporation of Pennsylvania
Filed Nov. 13, 1967, Ser. No. 682,091
Int. Cl. H02j 7/10
U.S. Cl. 320—22          4 Claims

ABSTRACT OF THE DISCLOSURE

An automatic varying rate battery charging circuit including a silicon-controlled rectifier, the conduction of which is effectively determined by the voltage level of the battery. The circuitry comprises a voltage dividing network and a transistor having its emitter and collector electrode shunted across a resistor of the voltage dividing network to insure the conduction of the controlled rectifier. A Zener diode connected at its cathode to the voltage dividing network is used to insure, through a second controlled rectifier, the tapering of a high charge current applied by the circuit to the battery when the battery reaches a point of gassing. At a maximum charge voltage level of the battery, the full conduction of the Zener diode causes, through the second controlled rectifier, the complete cut-off of the high charge current. A low or trickle charge current is supplied to the battery through a series connected resistor diode when the high charge current has been cut off.

BACKGROUND OF THE INVENTION

This invention relates to apparatus for charging direct current batteries and more particularly to a solid state device for charging a battery at varying rates.

In the field of emergency lighting it is becoming popular to charge storage batteries used therein, which must endure long periods of idleness, with the aid of solid state components rather than previously used electromechanical devices. These types of components having the advantage of being able to undergo long standby periods, and drawing little or no standby current, are ideal for these situations. One of the types of solid state battery chargers in use today is the two-rate charger which first applies to a discharged battery, a high rate charge essentially consisting of a high current application, to a cut-off point just prior to the boiling or gassing point of the battery; i.e. in a six-volt rated battery, which can be fully charged to 7.5 volts, the boiling or gassing point is approximately 7.2 volts. During the high charging period, the current remains at full rate, less some normal taper occurring during the voltage rise of the battery. After the battery has reached a point just prior to gassing, the high charge is discontinued and the charge rate becomes a continuous trickle charge of a relatively low current. This maintains the battery voltage during the standby period of the emergency lighting system, and the high rate of the charger remains inoperative until it is recycled once again.

While this two-rate charger is widely used, it has certain disadvantages which lessen its appeal. For one, a discharged battery should, for long life and efficient service, be charged to its full voltage capacity. The above described charger, however, merely charges the battery to a point just prior to its boiling point of 7.2 volts, for if the high charge rate of the charger were continued beyond the gassing point of the battery, the liquid contents of the battery might be boiled away.

Furthermore, if a battery is discharged completely during a long blackout period when the emergency system is in constant use, it is possible that the first high charge current applied by the charger to the battery after the emergency has ended will cause an initial increase of the voltage of the battery so that the high charge rate will be discontinued prematurely and the trickle charge rate cycled into operation. Because, in the above-mentioned two-rate charger, the high charge rate can only be made to operate when recycled into operation by another blackout and subsequent restoration of the non-emergency system, the battery will remain in the trickle charge state without ever having been fully charged.

Another drawback of the above-described charger arrangement occurs when a battery on trickle charge current develops an internal leak which causes it to become discharged at a faster rate than the low trickle current can recharge the battery. Since, as mentioned above, the high charge rate does not become operative until recycled, the battery will eventually become completely discharged and useless in case of an emergency.

Accordingly, it is a general object of this invention to provide an automatic, solid state battery charger which overcomes the disadvantages of the two-rate solid state charger described above.

It is a specific object of this invention to provide an efficient, reliable solid state battery charger which is able to charge a battery at varying rates to its full voltage capacity.

It is a further object of this invention to provide a solid state, high rate battery charger that will charge at full rate until the battery begins to gas and then will automatically maintain a taper charge rate thereon by reducing the current in proportion to the amount of gassing until the battery reaches its maximum charge voltage, at which time a stabilizing trickle charge current is activated to maintain the charge on the battery.

It is a further object of this invention to provide an automatic solid state battery charger capable of charging a battery to its full charge without boiling away the liquid contents thereof.

It is yet another object of this invention to provide an automatic solid state battery charger which employs a controlled rectifier as a control which determines the rate of charge applied to the battery.

It is another object of this invention to provide a solid state battery charger of the above described type which in addition uses a Zener diode connected to the gate of a second controlled rectifier for use in a voltage sensing circuit.

DESCRIPTION OF THE DRAWING

These and other objects and features of the invention will become more apparent from the drawing of which there is a single figure showing in schematic form the circuitry comprising the solid state automatic battery charger according to the invention.

DETAILED DESCRIPTION

Referring now to the drawings more in detail, the automatic battery charging circuit 10 includes a transformer 11 having a primary winding 13 and a secondary winding 15, the primary winding 13 being connected to an A.C. power line or power source (not shown). One side 14 of the secondary winding 15 is connected via lead 17 to the negative battery terminal 19 which in turn is connected to the negative side of a battery (not shown) to be charged by the circuit 10. The battery is a conventional lead acid type storage battery having a nominal six volt output. However, other types of batteries, such as a nickel-cadmium type, or the like, may be charged with the circuit according to the invention. The other side 16 of secondary winding 15 is connected via lead 21 to junction 23 and to the anode 24 of a controlled rectifier 25, preferably of the silicon type. Also connected at junction 23 is a resistor 27 which in turn is connected to a milliammeter 31 through a diode rectifier 29 poled to conduct current in a conventional sense from positive to negative toward milliammeter 31. The other end 33 of the milliammeter is connected to the positive battery terminal 35 via lead 41. These last-mentioned components are used for the trickle or low current charge circuitry in the automatic battery charger herein. The cathode 26 of controlled rectifier 25 is connected through an ammeter 37 which in turn is connected at junction 39 to lead 41 which is connected to the positive battery terminal 35. The high charge current is provided through this path to the battery when the controlled rectifier is in a state of conduction.

The conductive state of the controlled rectifier 25 determines the rate of current used to charge the battery and the conductive state of the rectifier is controlled by circuitry connected to the battery terminals and the gate electrode 47 of the rectifier. This circuitry, as will be explained more fully below, is operable to change the conductive state of the rectifier according to the voltage level of the battery detected thereby.

The detecting or voltage sensing circuitry used to determine the voltage level of the battery to be charged includes a voltage divider circuit comprising resistors 75, 77, 79 and 69 and a Zener diode 83 having its cathode connected to resistor 77 which is preadjusted to render the diode 83 conductive at a predetermined voltage level. A transistor 57, the emitter and collector electrodes of which are connected across resistor 69 of the voltage dividing network menioned above, acts as a latching means in that when the transistor is conducting the resistor 69 is shunted, thereby to change the potential at tap 111 of resistor 77 connected to diode 83 so as to positively prevent the diode from conducting. Furthermore, when the transistor 57 is biased to non-conduction, it no longer shunts resistor 69, and therefore allows the voltaie potential at tap 111 to reach a level at which Zener diode 83 will conduct to gate controlled rectifier 85 which in turn causes the controlled rectifier 25 to assume a state of non-conduction, only allowing the trickle or low charge current to pass to the battery. Transistor 57, as can be seen in the diagram, is biased through a voltage divider comprising resistors 59 and 61 connected to a capacitor 51 charged by the power source 11 through diode rectifier 49. The operation of the circuit will be explained more fully in the following paragraphs.

The controlled rectifier 25 is gated by a limiting resistor 43 connected at one end thereof to lead 22 and the anode of controlled rectifier 25 and at the other end to junction 50. Diode rectifier 45 is likewise connected between junction 50 and gate 47 of rectifier 25. A rectifier 49, poled to conduct current in a direction from junction 50 to junction 53 is provided to charge the capacitor 51 one side of which is connected at junction 53 to the diode 49 and at the other end thereof at junction 54 to cathode 91 of controlled rectifier 85. The voltage stored in capacitor 51 is used for the forward biasing of transistors 55 and 57. A forward bias voltage appears at the base of transistor 57 from the voltage divider resistors 59 and 61, the resistor 61 being connected at point 63 to the base 65 of transistor 57 at point 67 to lead 17 which in turn is connected to the emitter 73 of the transistor 57 at the negative battery terminal. As described briefly above, when the forward bias voltage appears at base 65 of transistor 57, the transistor conducts. This in turn shunts resistor 69 connected across the collector 71 and emitter 73 of transistor 57. It will be noted that the emitter 73 and one end of resistor 69 are connected to the negative battery terminal 19. The resistors 75, 77, 79 and 69, all connected in series, as mentioned above, act as a voltage dividing network, and along with the Zener diode 83 connected to the gate 87 of controlled rectifier 85, serve as a voltage sensing or detecting circuit. Resistor 77 which is adjustable, is preadjusted to cause the Zener diode 83 connected thereto to conduct at a 7.5 volt reference level of the battery (for a 6 volt rated battery). The controlled rectifier 85 has its gate electrode 87 connected to Zener diode 83. The anode of rectifier 85 is connected to the junction 50 of the diodes 45 and 49 and resistor 43. The cathode 91 of the rectifier 85 is connected to one side of capacitor 51, and a resistor 93 is connected to the gate electrode 87 thereof at point 95. The other end of resistor 93 is connected to junction 97 at the negative potential lead. A pilot light 99, connected to the collector 101 of transistor 55, serves as a high rate charge indicator. Transistor 55 is connected at its base electrode 102 through resistor 58 to junction 54 so that the voltage used to bias transistor 57 to a conducting state also serves to cause transistor 55 to conduct to act as a switch, lighting indicator lamp 99. A second pilot light 103, connected across resistor 43, is provided to indicate the trickle charge state of the circuit. The meters 31 and 37 provide an accurate indication of the current valve of the trickle and high charges, respectively, but may be removed in favor of the lamps (as shown in dotted lines) when one only cares to know at a glance the state of the charging circuitry and battery. If desired, however, both the lamps and meters may be used as shown.

For purposes of affording a more complete understanding of the invention it is advantageous now to provide a functional description of the mode in which the component parts thus far described cooperate.

When the battery to which the circuitry according to the invention is connected has become discharged because of the operation of the emergency lighting system or the like which it powers, it must be recharged so as to be able to power the next emergency operation of the system when the time arrives. As the alternating current source or line once again returns to full operation, current is caused to flow through the secondary 15 of transformer 11 to operate the circuit 10 to in turn charge the battery. If the battery voltage has dropped to a point at or below a predetermined voltage level, in this case 6.3 volts, this will be sensed by the voltage sensing network which includes resistors 75, 77, 79 and 69 and Zener diode 83. The voltage across the battery terminals determines the rate of charge that will be provided to the battery. As will be noted, resistor 77 is adjustable by means of tap 111 connected to Zener diode 83. The setting of resistor 77 is such that the diode 83 will conduct at a predetermined voltage level of 7.5 volts. With the battery voltage below this 6.3 volt level, the Zener diode is in a nonconductive state.

The current from secondary 15 of transformer 11 passing through lead 22 of the circuit thus charges, through diode 49, the capacitor 51. The voltage across capacitor 51 is subsequently employed to forward bias transistors 55 and 57. A forward bias voltage appears at the base 65 of latching transistor 57 from the voltage divider resistors 59 and 61 of the circuit, causing transistor 57 to conduct, shunting resistor 69 of the voltage divider network 110 positively to insure the non-conduction of Zener diode 83. With resistor 69 shunted by transistor 57, the voltage dividing network is in its high charge state. Current from the secondary 15 of transformer 11 serves, through the circuit comprising resistor 43 and diode 45 connected to the anode and gate electrodes respectively of controlled rectifier 25, to cause the rectifier 25 to conduct, providing therethrough a high charge current rate for the discharged battery. Transistor 55, which is also biased to conduct, acts as a switch to light lamp 99 without reaction of lamp 99 on other parts of the circuit, indicating that the high charge rate is in operation. After charging the battery at a high charge rate of current, a point of gassing, approximately 7.2 volts for a 6 volt rated battery, will be attained.

Since the silicon controlled rectifiers (SCR's) 25 and 85 are in an AC circuit they can conduct no more than on alternate ½ cycles, and actually slightly less than ½ cycle. When the battery voltage is low, the SCR 85 will be biased off, thus causing the potential at point 50 to bias SCR 25 for maximum conduction, thus resulting in a high charge rate. As noted earlier, the charge on the capacitor 51 biases the transistor 57 to conduction, shorting out the resistor 69, and thereby lowering the voltage picked off by the tap 111 below what it would be in the absence of the transistor 57.

As the battery voltage rises, the potential applied to the gate 87 of the SCR 85 will rise when the Zener diode 83 reaches its breakdown potential, and the SCR will become progressively more conductive due to control of the phase in which the SCR fires, in accordance with known techniques. This will tend to lower the voltage at 50 to the potential of line 17, thus cutting off SCR 25 as SCR 85 becomes conductive, thus cutting off the high charge rate. As the SCR 85 becomes conductive and the potential at point 50 approaches the line 17 the capacitor 51 discharges through resistors 59 and 61, whereby transistor 57 is progressively cut off, and renders the resistor 69 progressively more effective, thereby to raise the potential picked off by the tap 111 at a more rapid rate than the battery voltage rises.

When the battery reaches 7.5 volts, which is also the reference voltage set by resistor 77 connected to Zener diode 83 by lead 111, the Zener diode 83 conducts fully to gate the controlled rectifier 85 to a conductive state so as to eliminate substantially the voltage at junction 50. This in turn removes the bias voltage from the base 65 of transistor 57 as well as from the base 102 of transistor 55. The cutting off of transistor 55 turns off lamp 99 and shows no reading in ammeter 37 connected in series therewith to indicate that the high charge rate has discontinued. The gating voltage to controlled rectifier 25 is likewise cut off and the high charge current to the battery is eliminated, allowing only the trickle charge current to pass through resistor 27 and diode 29 to hold the battery in a "float" charge condition at a voltage level of approximately 6.8 volts. The lamp 103 through a circuit including anode 89 of controlled rectifier 85 through the rectifier and junction point 97 to lead 17, back to the secondary 15 of transformer 11, through transformer secondary lead 21 and to lead 22 and resistor 43, lights to indicate the trickle charge is in operation. Further, the milliammeter shown in the drawing is connected in series with resistor 27 and diode 29 indicates the exact reading of the current flowing during the trickle charge state. As stated above, however, the meters may be removed and only the lamps may be used to indicate the state of charge of the circuitry. The battery is maintained on the trickle charge until another emergency arises and the emergency lighting system powered by the battery connected to this circuit is once again employed. When the voltage of the battery once again drops to any level below the 6.8 level flow charge, the appropriate charging current is activated. No cycling is required for the trickle charge or high charge because the operation thereof is dependent upon the voltage state of the battery at the time the use of the emergency system is discontinued.

Thus, the automatic battery charger according to the invention provides a charging circuit which charges a discharged battery at a full rate until the battery reaches a point of gassing or boiling, at which time it will automatically maintain a taper charge rate on the battery by reducing the current in proportion to the amount of gassing until the battery reaches a predetermined maximum charge voltage; i.e. approximately 7.5 volts. This high charge rate then discontinues, after which a stabilizing trickle charge current will be activated to "float' charge the battery at a lower predetermined voltage level of approximately 6.8 volts during the standby period. If, for any reason, the voltage of the battery drops below 6.3 volts, the circuit automatically restarts the high charge rate.

The specific example of the invention as herein shown and described is by way of example only. Various changes will no doubt occur to those skilled in the art, and will be understood as forming a part of the present invention insofar as they fall within the spirit and scope of the appended calims.

The invention is claimed as follows:

1. Apparatus for charging a storage battery at varying rates, said apparatus comprising: a power source; a pair of terminals, one being for the connection thereto of the positive terminal of said battery and the other for the connection thereto of the negative terminal of said battery; low current charge circuit means connected between said power source and said terminal pair; high current charge circuit means including a controlled rectifier having a gate electrode, said high charge circuit means being connected between said power source and said terminal pair; and circuit means for controlling the conduction of said controlled rectifier, said circuit means being connected between said terminal pair and said gate electrode, said circuit means being operable upon the voltage of said battery being below a first predetermined voltage level to gate said rectifier to a state of full conduction, thereby to cause said high charge current circuit means to charge said battery at a high rate, said circuit means being operable between a second and third voltage level of said battery of a greater voltage than said first predetermined voltage level, to gate said rectifier so as to become correspondingly less conductive as said battery voltage rises from said second voltage level to said third voltage level, thereby to taper said high charging current correspondingly, and upon reaching said third voltage level said circuit means gating said rectifier to a non-conductive state so as to allow only said low current charge circuit means to charge said battery, and circuit means for controlling the conduction of said controlled rectifier including voltage detection means comprising a voltage dividing network including a plurality of resistors connected in series between said terminal pair of a Zener diode connected to one of said resistors to effectively control the conduction of said controlled rectifier, said Zener diode being present to conduct at said third predetermined voltage level, said circuit means for controlling the conduction of said controlled rectifier further including latching means comprising a transistor having a base, emitter and collector electrode, the emitter and collector electrode connected in shunting relationship to a second one of said resistors of said voltage dividing network, and said base electrode effectively connected to said power source through a second voltage dividing network, said network being connected in turn to a capacitor having a voltage charge stored therein from said power source, by means of a series connected rectifier means, upon the operation of said high current charge circuit, said transistor being biased at said base electrode to a state of conduction so as to shunt said resistor, thereby to positively prevent said Zener diode from conducting.

2. Apparatus for charging a storage battery as claimed in claim 1 wherein said circuit means for controlling the conduction of said controlled rectifier further includes a second controlled rectifier having an anode, cathode and gate electrode, the gate electrode thereof being connected to, and operative to a state of conduction by means of, said Zener diode, said anode and cathode connected across said series connected capacitor and rectifier means, so that upon the gating of said second controlled rectifier to a state of conduction by said Zener diode, said rectifier shunts said capacitor causing the bias voltage, effectively supplied therefrom to the base of said transistor, to be cut off thereby to cause said transistor to assume a state of non-conduction.

3. A circuit for charging a storage battery at varying rates, said circuit comprising: a power source having a first and second terminal; a second pair of terminal members, one being for the connection thereto of a positive battery terminal and the other being for the connection thereto of a grounded battery terminal, a first one of said terminals of said power source being connected to the ground terminal of said battery; a low charge current circuit including a resistor connected between said positive battery terminal and said second terminal of said power source; a high charge current circuit including a controlled rectifier having an anode, a cathode and a gate electrode, the anode thereof being connected to said second terminal of said power source and the cathode threof being connected to said positive battery terminal; and circuit means for controlling the state of conduction of said controlled rectifier connected to the gate electrode thereof, said circuit means comprising, a capacitor, one side thereof connected to rectifier means which in turn are connected to a first junction, whereat the gate electrode of said controlled rectifier is connected through a diode, said second terminal of said power source and said first junction being interconnected by means of a limiting resistor, the other side of said capacitor being effectively connected to the grounded battery terminal, a second controlled rectifier having an anode, a cathode and a gate electrode, said anode being connected to said first junction and the cathode being effectively connected to said grounded battery terminal, a voltage sensing circuit including a plurality of resistors connected in series between said battery terminals, and a Zener diode having a pair of electrodes, one of which is connected to one of the resistors of said series, said Zener diode being conductable at a first predetermined voltage level, the other electrode of said Zener diode being connected to the gate electrode of said second controlled rectifier, and a transistor having a base, collector and emitter electrode, said base electrode connected to a voltage dividing network, said emitter electrode connected to the grounded side of a second one of the resistors of said series and said collector electrode connected to the other side of said resistor, said capacitor connected to said voltage dividing network and said transistor being biased at the base electrode thereof by the voltage across said capacitor, to a state of conduction upon the operation of the high charge current circuit, and upon the voltage of said battery reaching said first predetermined voltage level, said Zener diode conducting and thereby effectively causing said transistor to become nonconductive.

4. A circuit for charging a storage battery as claimed in claim 3 further including a second transistor having a base and collector electrode and being connected in grounded emitter fashion, the base electrode of said transistor being connected to said power source through said rectifier means, and said collector electrode being connected to the cathode of said first controlled rectifier through a lamp means, said transistor being conductive upon the conduction of said first controlled rectifier, thereby to light said lamp means to indicate the operation of said high charge circuit.

References Cited

UNITED STATES PATENTS

| | | | |
|---|---|---|---|
| 3,018,432 | 1/1962 | Palmer | 323—66 |
| 3,281,638 | 10/1966 | Crawford | 320—40 |
| 3,305,754 | 2/1967 | Oaks et al. | 320—37 |
| 3,310,724 | 3/1967 | Grafham | 320—39 |
| 3,336,519 | 8/1967 | Grimm | 320—48 |
| 3,412,308 | 11/1968 | Brown | 320—24 |
| 3,421,066 | 1/1969 | Flynn et al. | 320—SCRUX |

J D MILLER, Primary Examiner

J. M. GUNTHER, Assistant Examiner

U.S. Cl. X.R.

320—39, 48

UNITED STATES PATENT OFFICE
CERTIFICATE OF CORRECTION

Patent No. 3,553,561          Dated   January 5, 1971

Inventor(s)   John C. Lesher

It is certified that error appears in the above-identified patent and that said Letters Patent are hereby corrected as shown below:

Column 3, line 39-40, change "voltaie" to --voltage--;

Column 3, line 63, after "57" insert --and--;

Column 4, line 20, change "valve" to --value--;

Column 6, line 5, change "calims" to --claims--;

Column 6, line 38, after "pair" change "of" to --and--;

Column 6, line 42, change "present" to --preset--

Signed and sealed this 29th day of June 1971.

(SEAL)
Attest:

EDWARD M.FLETCHER,JR.            WILLIAM E. SCHUYLER, JR.
Attesting Officer                Commissioner of Patents